Feb. 5, 1924.
B. HASKELL
BRAKE SUPPORT
Filed Oct. 24, 1922
1,482,610
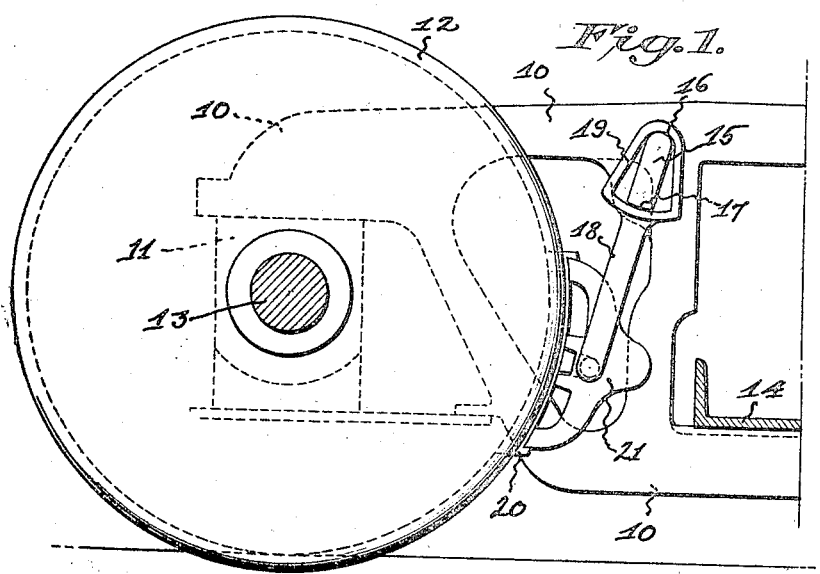
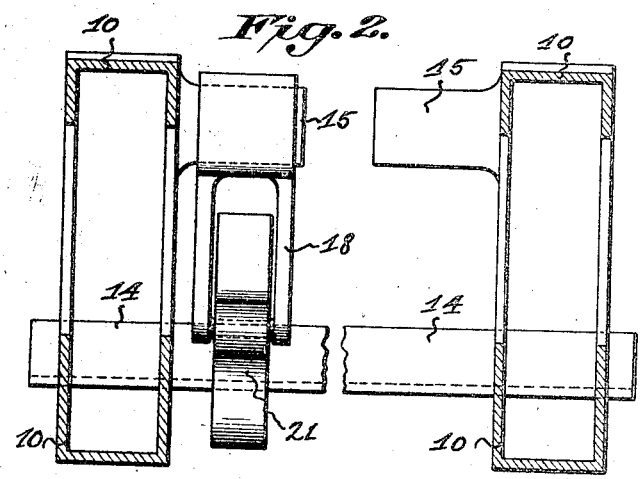
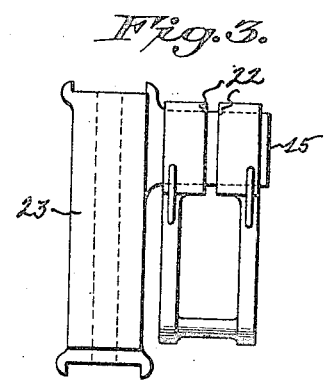
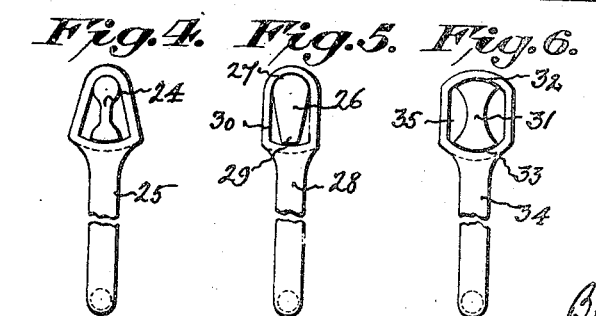
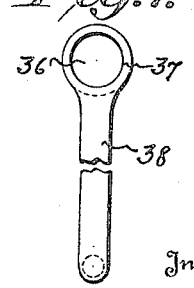
Inventor
Broderick Haskell,
WITNESS
Chas. L. Grieshaver
Attorney Patented Feb. 5, 1924.

1,482,610

UNITED STATES PATENT OFFICE.

BRODERICK HASKELL, OF FRANKLIN, PENNSYLVANIA.

BRAKE SUPPORT.

Application filed October 24, 1922. Serial No. 596,592.

*To all whom it may concern:*

Be it known that I, BRODERICK HASKELL, a citizen of the United States, residing at Franklin, in the county of Venango and State of Pennsylvania, have invented new and useful Improvements in Brake Supports, of which the following is a specification.

This invention relates to car trucks, and more particularly to the supporting means and hangers for suspending the brake beams in secure and proper relation to correctly maintain the brake shoes with respect to the wheels and brake operating mechanism.

The objects of the invention are as follows:—

First, to provide a brake support of the character above indicated which can be cheaply manufactured, easily applied and adjusted or removed from the truck frame without being required to remove or apply coupling pin or pins.

Second, to provide a brake support in which increased bearing surface for the brake hanger is provided without increasing the size or weight of said support and insuring decreased wear and slack or lost motion to the gear controlling the application of the brakes.

Third, to provide a brake support which will not unduly or unevenly wear, thereby preventing the tilting or inefficient position of the brake beams or shoes, and at all times holding them normal to the wheel axles, so that the top of said brake shoes will not be in position to continuously grind against the wheels when the brakes are not being applied.

Fourth, to construct and arrange the journal or bearing surface of the suspension means carrying the brake hangers so as not only materially increase and properly distribute said bearing surfaces, but at the same time more directly and safely resist the pull or strain when the brakes are applied and thereby reduce to a minimum the liability of the brake beam falling on the track by reason of the broken brake hangers or hanger supports which frequently occurs from the present constructions causing disastrous and expensive wrecks.

Other objects and advantages of the invention will appear and be manifest from the detailed description of the construction and arrangement of parts to be presently given.

The invention consists of structural characteristics and relative arrangements of elements which will be hereinafter more fully described and particularly pointed out in the appended claims.

In the drawings in which similar reference characters indicate the same parts in the several figures:

Figure 1 is a longitudinal sectional view of a portion of a side frame with the improved brake support applied.

Figure 2 is a fragmentary and transverse sectional view of the side frame shown in Figure 1.

Figure 3 is a fragmentary and end view of a truck of the arch bar column type with the present invention applied.

Figures 4, 5, 6 and 7 are side elevations of modified forms of supporting lugs and hangers for suspending the brake beams.

Referring to Figures 1 and 2, 10 represents one-half of the usual steel truck frame on each side of a car truck carrying the standard form of boxes 11, wheels 12, axle 13, and a spring plank 14. Each of said frames 10 is of channel shape, as shown in Figure 2, and is provided on its inner side or wall with a suspension means, lug or projection 15 adapted to form a journal or bearing for the upper end of the brake hanger to be presently described.

Said lugs or projections 15 may be and are preferably cast integral with the frames and so arranged as to be horizontal and alined with each other in the opposite and inner sides of the truck, as clearly shown in Figure 2. Lugs or projections 15 may be cast with an elongated cross-section and arranged with their longer sides vertical or slightly inclined, as shown in Figure 1. for the purpose of not only securing additional resisting power against a downward pull due to the weight of the brake beam, brake head and shoes, but at the same time having the upper and lower curved edges 16 and 17 of said lugs or projections 15 form upper and lower bearing or journal surfaces and said lower curved surface 17 being formed on a greater radius than the upper surface 16, as indicated.

Brake hangers 18 having their upper ends provided with enlarged or elongated openings 19 so constructed as to encircle the projections or lugs 15 and have the upper and lower surfaces of said openings 19, so formed or rounded as to have a sliding or rotatable contact with the upper and lower curved bearing or journal surfaces 16 and 17 of the lugs or projections 15, and permit the lower ends of said brake hangers 18 to have the proper and required oscillatory movement for the correct application of the brake shoes 20, secured to the usual brake heads 21 pivotally connected to the lower or oscillating ends of said brake hangers 18 as is common in this class of devices.

The brake hangers 18 instead of having their upper ends solid, as shown in Figures 1 and 2, may be divided or split at 22, as illustrated in Figure 3, and also capable of being applied to the form of frame 10 shown in Figure 1, or to a truck of the arch bar column type, as indicated by 23 in Figure 3.

Figure 4 shows a lug or projection 24 of the same general cross-section or type as shown in Figure 1, except that its vertical walls are slightly recessed, while the relation of the radii and shape of the upper and lower curved bearing surfaces of said projection 24 and the sector-shaped opening in the upper end of the brake hanger 25 are the same as disclosed in Figure 1.

In Figure 5 the lug or projection 26 has the upper and lower curved bearing surfaces of substantially the same curvature as shown in Figures 1 and 4, except that it is provided with a maximum upper bearing surface 27 for a given arc of movement of the brake hanger 28 by reason of the tapered lower end 29 of said projection or lug 26. The opening 30 in the hanger 28 approaches a rectangle in cross-section instead of being sector-shaped, as shown in Figures 1 and 4.

The lug or projection 31 shown in Figure 6, has its upper and lower curved bearing surfaces 32 and 33 of the same curvature and struck from the same center and its side walls are recessed similarly as shown in Figure 4. The upper end of the brake hanger 34 is provided with an opening 35 similar in shape to that shown in Figure 5.

Figure 7 shows a lug 36 circular in cross-section and the opening 37 in the upper end of the brake hanger 38 is circular and rotatably engaging said circular lug 36 as indicated.

From the location and arrangement of the suspension lugs or journals on the inner sides of the truck frames and the cooperating openings in the upper ends of the brake hangers, not only is a maximum bearing surface effected with a minimum of friction between said brake hangers and its supporting means, but at the same time the strain or resistance when the brakes are applied is taken up and is in the direction of greatest resisting power of the suspension lugs or journals, and the openings at the upper end and arrangement of the brake hangers permit any one of said brake hangers to be installed or removed without skilled labor or being required to remove coupling pins or disturb any other brake hanger. The present arrangement and construction of brake support also enables the brake hangers to properly arrange themselves with respect to their brake beam connections and curved bearings or journals of the lugs or projections as to correctly adjust, apply or release the brake shoes with respect to the truck wheels in order to have the different elements comprising the brake gear mechanism to have positive, safe and efficient action under all conditions of service.

From the foregoing disclosure of the construction and arrangement of the improvement and mode of applying and operation of the same, it will be seen that all the objects and advantages recited in the statement of invention have been fully and efficiently carried out, and while I have shown and described my preferred form, many changes will readily suggest themselves without in any way departing from the salient features herein disclosed and embodied in the scope of the claims.

What I claim is:—

1. A car truck, comprising side frames having inner walls and a lug of elongated cross-section extending from the inner side of each of said side frames, an oscillating brake hanger having an upper end with an opening and adjacent to the inner wall of each of said side frames and supported from said lug by said opening, and a brake beam having its ends connected to the other or free ends of said oscillating brake hangers.

2. A car truck comprising side frames having inner walls and a lug of elongated cross-section extending from the inner side of each of said side frames with its longitudinal axis in substantially an upright position, an oscillating brake hanger having an upper end with an elongated opening and adjacent to the inner wall of each of said side frames and supported from said lug by said opening, and a brake beam having its ends connected to the other or free ends of said oscillating brake hangers.

3. A car truck comprising side frames having inner walls and a lug of elongated cross-section extending from the inner side of each of said side frames, an oscillating brake hanger having an upper end with an elongated opening and adjacent to the inner wall of each of said side frames and supported from said lug by said elongated opening, and a brake hanger having its ends connected to the other or free ends of said oscillating brake hangers.

4. A car truck comprising side frames having inner walls and a lug of elongated cross-section extending normally from the plane of the inner side of each of said side frames with its longitudinal axis in substantially an upright position and the curvature of the upper edge being on a shorter radius than the curvature of the lower edge, an oscillating brake hanger having an upper end with an elongated opening and adjacent to the inner wall of each of said side frames and supported from said lug by said opening, and a brake beam having its ends connected to the other or free ends of said oscillating brake hangers.

5. A car truck comprising side frames having inner walls and a lug of elongated cross-section extending normally from the plane of the inner side of each of said side frames with its longitudinal axis in substantially an upright position and the upper and lower edges of said lug being rounded to form bearing surfaces, an oscillating brake hanger having an upper end with an elongated opening and adjacent to the inner wall of each of said side frames and supported from said lug by said opening, and a brake beam having its ends connected to the other or free ends of said oscillating brake hangers.

In testimony whereof I affix my signature.

BRODERICK HASKELL.